(12) United States Patent
Blichmann et al.

(10) Patent No.: US 6,584,997 B1
(45) Date of Patent: Jul. 1, 2003

(54) OVERFLOW PREVENTION MECHANISM FOR LIQUID TRANSFER SYSTEMS

(75) Inventors: John R. Blichmann, Lafayette, IN (US); Scott A. Kloeblen, Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/050,688

(22) Filed: Mar. 30, 1998

(51) Int. Cl.[7] .................. F16K 31/02; F16K 31/12; G05D 9/12
(52) U.S. Cl. .............. 137/392; 141/198; 307/118; 361/178; 417/36; 417/44.1; 417/44.11; 417/45; 123/198 D
(58) Field of Search .............. 417/36, 41, 44.1, 417/44.4, 44.11, 45; 137/392, 454; 141/198; 123/198 D, 510, 511; 307/118; 361/178

(56) References Cited

U.S. PATENT DOCUMENTS

| | | | |
|---|---|---|---|
| 1,911,987 A | | 5/1933 | Casey |
| 2,202,197 A | * | 5/1940 | Ewertz .................. 137/592 |
| 2,405,998 A | | 8/1946 | Buttner et al. ................ 62/1 |
| 2,573,035 A | * | 10/1951 | Long ........................ 137/557 |
| 3,136,871 A | * | 6/1964 | Barletta ................... 417/36 |
| 3,252,420 A | * | 5/1966 | Sorenson ................ 417/36 |
| 3,602,251 A | * | 8/1971 | Hill ........................ 137/392 |
| 3,671,142 A | * | 6/1972 | Calabrese ................ 137/392 |
| 3,741,683 A | * | 6/1973 | McTamaney et al. ......... 417/7 |
| 3,759,286 A | * | 9/1973 | Page ....................... 137/392 |
| 3,876,037 A | * | 4/1975 | Rath, Jr. ..................... 184/6.4 |
| 3,882,967 A | * | 5/1975 | Gulla et al. ................ 137/392 |
| 3,903,939 A | | 9/1975 | Pickett ......................... 141/1 |
| 3,922,564 A | * | 11/1975 | Kachuk et al. ............ 307/118 |
| 4,061,442 A | * | 12/1977 | Clark et al. ............... 417/36 |
| 4,244,385 A | * | 1/1981 | Hotine ...................... 137/392 |
| 4,265,262 A | * | 5/1981 | Hotine ........................ 417/36 |
| 4,305,420 A | * | 12/1981 | Nussdorf .................. 137/392 |
| 4,380,091 A | * | 4/1983 | Lively ......................... 4/508 |
| 4,763,621 A | * | 8/1988 | Stevens ..................... 417/36 |
| 4,805,662 A | * | 2/1989 | Moody ..................... 137/392 |
| 5,141,019 A | | 8/1992 | LeBlanc et al. ............ 137/423 |
| 5,170,310 A | * | 12/1992 | Studtmann et al. .......... 361/94 |
| 5,207,251 A | * | 5/1993 | Cooks ......................... 41/83 |
| 5,445,193 A | | 8/1995 | Koeninger et al. .......... 141/18 |
| 5,607,000 A | | 3/1997 | Cripe et al. ................. 141/21 |
| 5,771,178 A | * | 6/1998 | Stemporzewski, Jr. et al. .. 137/392 |

FOREIGN PATENT DOCUMENTS

| | | | | |
|---|---|---|---|---|
| JP | | 49108 | * 5/1991 | ................. 417/36 |

* cited by examiner

*Primary Examiner*—George L. Walton
(74) *Attorney, Agent, or Firm*—Blackwell Sanders Peper Martin LLP

(57) ABSTRACT

An overflow prevention mechanism for use in association with liquid transfer systems of the type including an electrically controllable flow control device such as a pump connected between a source of liquid and a liquid tank, the mechanism including a backup liquid level sensor and a shunt trip breaker or other normally-closed switching device. The backup liquid level sensor senses if the level of liquid within the tank reaches an extreme high level. When the liquid level within the tank reaches the extreme high level the backup liquid level sensor produces an output indicative of the liquid having reached such extreme high level. The shunt trip breaker is connected between the source of electrical energy and the flow control device. The shunt trip breaker is operatively connected to the backup liquid level sensor so as to respond to the production of the backup liquid level sensor output by opening, thereby disconnecting the flow control device from the electrical energy source when the liquid level within the tank reaches the extreme high level.

15 Claims, 1 Drawing Sheet

OVERFLOW PREVENTION MECHANISM FOR LIQUID TRANSFER SYSTEMS

TECHNICAL FIELD

This invention relates generally to controls used in liquid transfer systems, and more particularly, to an overflow prevention mechanism which prevents overflow of a container such as a fuel tank when a liquid such as fuel is being transferred thereto, particularly in systems where such transfers occur on a repeating basis.

BACKGROUND ART

In some internal combustion engine applications, particularly large engines used in generator applications, it is desirable to assure that the engine has a relatively continuous supply of fuel available. If fuel delivery to the engine is interrupted the engine will quit running and power output from the generator will likewise cease, causing an undesired blackout in those situations where the generator is relied upon for power.

Large engines in generator applications are typically provided with a small fuel tank which might hold enough fuel to run the engine for about a day. The fuel tank is connected to a larger, bulk fuel tank or other main source of fuel which can be used to fill the fuel tank as needed. For example, a pump may be connected between the main source of fuel and the fuel tank. The fuel tank may include a low fuel level sensor and a high fuel level sensor, both connected through a controller to control a normally-open motor relay, which motor relay is connected between a source of electrical energy and a motor which operates the pump. The low fuel level sensor acts as a pump start sensor in that if the level of fuel in the fuel tank falls to the low level, the low fuel level sensor produces an output which is provided to the controller and the controller responsively energizes the motor relay to connect the motor in circuit with the electrical energy source. Fuel is transferred from the main source of fuel to the fuel tank during operation of the pump. The high fuel level sensor acts as a pump stop sensor in that when the level of fuel in the fuel tank reaches the high level, the high fuel level sensor produces an output which is provided to the controller and the controller responsively de-energizes the motor relay causing the motor to stop and likewise causing the transfer of fuel to stop.

A potential problem with such fuel transfer systems is that if the current supplied through the relay is too high, arcing may occur and cause the motor relay to essentially weld itself in the closed position. In such cases, even where the failed motor relay is de-energized, the motor relay may remain closed causing fuel transfer to the fuel tank to continue past the desired stopping point unless the pump motor is manually turned off. Such situations can result in undesired overflow of the fuel tank.

Other types of liquid transfer systems include normally-open switching devices which may be subject to failing in a closed position due to arcing which results from repeated closing and opening of such devices. The mere addition of another normally-open switching device such as a relay in such circuits cannot satisfactorily address the problem because, for example, if one normally-open motor relay fails in the closed position due to arcing it is possible that another similar normally-open motor relay will also fail in the closed position due to arcing.

Accordingly, the present invention is directed to overcoming one or more of the problems as set forth above.

DISCLOSURE OF THE INVENTION

In one aspect of the present invention, a liquid transfer system for repeatedly transferring a liquid from a main liquid source to a container while preventing overflow of the container is provided. A liquid path connects the main liquid source to the container. An electrically controllable flow control device is positioned along the liquid path for enabling controlled delivery of liquid from the main liquid source to the container along the liquid path. A liquid level sensor is provided for sensing when the level of liquid within the container rises to a predetermined extreme high level. A normally-closed switching device is connected between a source of electrical energy and the electrically controllable flow control device. The liquid level sensor is operatively connected to the normally-closed switching device for effecting the opening thereof when the level of liquid in the container reaches the predetermined extreme high level such that further liquid transfer to the container is prevented.

In another aspect of the present invention an overflow prevention mechanism for use in association with a fuel transfer system is provided, where the fuel transfer system includes a pump connected between a source of fuel and a fuel tank which may be filled with fuel from the source of fuel by operation of the pump, a relay connected between a source of electrical energy and a pump motor which operates the pump, and a fuel level sensor for sensing when the fuel level within the fuel tank reaches a predetermined high level at which it is desired to stop further fuel transfer thereto, the fuel level sensor operatively connected to the relay to effect control thereof. The overflow prevention mechanism includes a backup fuel level sensor and a shunt trip breaker. The backup fuel level sensor senses if the level of fuel within the fuel tank reaches an extreme high level which is higher than the predetermined high level. When the fuel level within the tank reaches the extreme high level the backup fuel level sensor produces an output indicative of the fuel having reached such extreme high level. The shunt trip breaker is connected between the source of electrical energy and the pump motor in circuit with the relay when such relay is closed. The shunt trip breaker is operatively connected to the backup fuel level sensor so as to respond to the production of the backup fuel level sensor output by opening, thereby disconnecting the pump motor from the electrical energy source when the fuel level within the fuel tank reaches the extreme high level.

BRIEF DESCRIPTION OF THE DRAWINGS

For a better understanding of the present invention, reference may be made to the accompanying drawing in which.

BEST MODE FOR CARRYING OUT THE INVENTION

Figure 1:
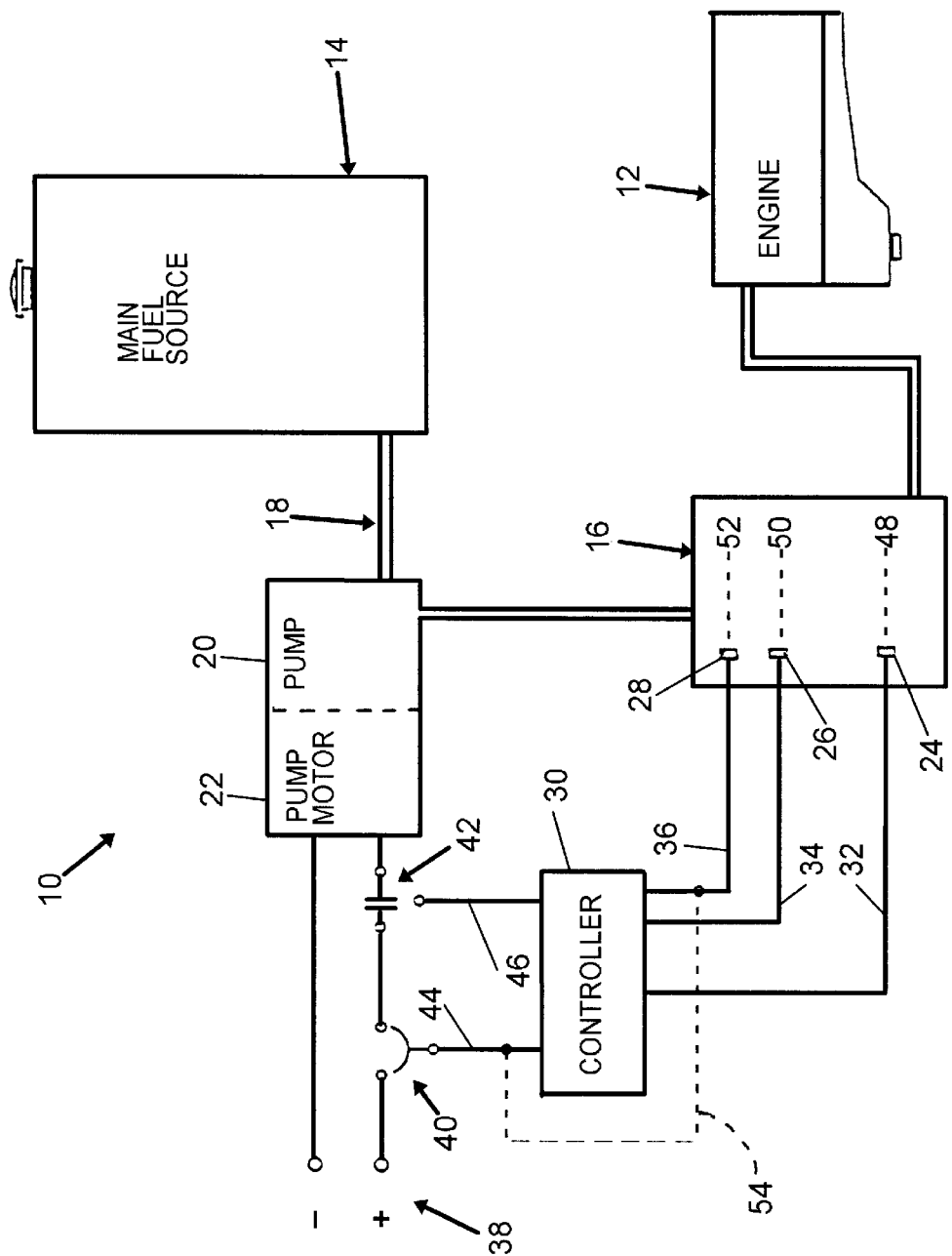
FIG. 1 is a schematic depiction of a fuel transfer system in accordance with the present invention.

Referring to the drawing, numeral 10 in FIG. 1 depicts an internal combustion engine system including engine 12, a main source of fuel 14, and small fuel tank 16. Main source of fuel 14 may be a bulk fuel tank which is large enough to hold a sufficient amount of fuel to fill small fuel tank 16 many times over. Engine 12 is connected to receive fuel from fuel tank 16. A fuel path 18 extends from main fuel source 14 to fuel tank 16. A pump 20 positioned along fuel path 18 includes an operating motor 22. When pump 20 is operated by motor 22, fuel is delivered from main fuel source 14, along fuel path 18, to fuel tank 16.

Fuel tank 16 includes a fuel level sensor 24, a fuel level sensor 26, and a fuel level sensor 28. Such fuel level sensors 24, 26, 28 could be any of a variety of known types, including, for example, float actuated sensors, the exact nature of the fuel level sensors not being critical to the present invention. Each fuel level sensor 24, 26, and 28 is connected to an electronic controller 30 via respective conductive paths 32, 34, and 36. An electrical energy source 38 is connected through a normally-closed shunt trip breaker 40 and motor relay 42 to pump motor 22 for delivering electrical energy thereto. The breaker 40 and relay 42 are connected in series along the same electrical path between the pump motor 22 and the energy source 38. Controller 30 is connected for controlling each of shunt trip breaker 40 and motor relay 42 via respective paths 44 and 46.

In operation, when the level of fuel within tank 16 falls to a predetermined low level 48 fuel level sensor 24 produces an output indicative of the fuel having fallen to such predetermined level 48. Controller 30 responds to such level indicative output from sensor 24 by energizing motor relay 42 so that pump motor 22 begins operating and fuel transfer from main fuel source 14 to fuel tank 16 is initiated. When the level of fuel in fuel tank 16 reaches a predetermined high level 50 fuel level sensor 26 produces an output indicative of the fuel having risen to predetermined level 50. Controller 30 responds to such level indicative output from sensor 26 by de-energizing motor relay 42 so that pump motor 22 stops operating and, under normal conditions, fuel transfer from main fuel source 14 to fuel tank 16 is stopped.

In the event that motor relay 42 fails in the closed position so that motor relay 42 does not open when de-energized, fuel level sensor 28 is provided as a backup sensor at a predetermined extreme high level 52. When, due to undesired continued fuel transfer, the level of fuel in fuel tank 14 reaches predetermined level 52, fuel level sensor 28 produces an output indicative of the fuel having risen to such predetermined level 52. Controller 30 responds by delivering a control signal to shunt trip breaker 40 which triggers the opening of such shunt trip breaker 40 and disconnects pump motor 22 from electrical energy source 38, thereby stopping further fuel transfer and preventing an overflow situation.

In terms of controller 30, such controller 30 will typically include input/output circuitry necessary to responsively provide the functions identified above. In a simple form, such controller 30 may include a plurality of micro switches for opening/closing various circuits in response to the outputs of the fuel level sensors 24, 26, 28.

Although the control input of shunt trip breaker 40 is shown connected to electronic controller 30, it is recognized that such control input could be directly connected to fuel level sensor 28, as shown by alternate conductive path 54, in cases where fuel level sensor 28 is configured to provide an appropriate output capable of triggering such shunt trip breaker 40. Thus, fuel level sensor 28 may be selected to provide a DC voltage directly to the control input of shunt trip breaker 40.

Industrial Applicability

The present invention provides a fuel/liquid transfer system including a safety mechanism for preventing fuel/liquid tank overflow. Use of a shunt trip breaker in such safety mechanism is advantageous in that such shunt trip breaker is not prone to the same types of failures as normally-open motor relays. In particular, the normally-closed shunt trip breaker is not repeatedly opened and closed and therefore is not subjected to the arcing that a normally-open relay may be subjected to in such systems. When the shunt trip breaker is tripped the pump motor is cut off from the power supply such that fuel/liquid transfer to the fuel/liquid tank is stopped thereby eliminating the possibility of fuel/liquid tank overflow.

Preferably, the normally-closed switching device is a shunt trip breaker the opening of which is triggered by application of a DC voltage at the control input thereof. The backup fuel level sensor and associated normally-closed switching device provide an overflow prevention mechanism which is independent of the normal ON/OFF control provided in known systems. Further, if the normally-closed switching device is tripped by the backup fuel level sensor an operator alarm such as a light, buzzer, or even computer flag could be set so that the operator is made aware of the problem. Preferably, the normally-closed switching device must be reset manually so that an operator can address whatever the problem may be with the normally open motor relay.

Although use of a pump having an operating motor is shown in the preferred embodiment, it is recognized that systems may include other types of electrically controllable flow control devices including, but not limited to, a solenoid valve used in a pressurized fuel/liquid transfer system or a solenoid operated diaphragm pump. Similarly, although the use of a shunt trip breaker is described and is preferred, it is recognized that other types of normally-open switching devices could be used. For example, a GFI breaker could be connected so that an applied voltage would trip the GFI breaker. It is also recognized that a float type sensor could be mechanically connected to a normally-closed switch so as to mechanically open the switch when the fuel level reaches the extreme high level. Still further, although the use of a separate sensor for detecting each of the levels 48, 50 and 52 is shown, it is recognized that a single continuous output probe could be utilized which probe outputs a signal having a parameter, such as current, which varies as the level of fuel/liquid in the tank/container varies. In such cases the controller would be configured to be responsive to different levels of the signal parameter.

Although the present invention has been shown and described in detail, it is recognized that various modifications could be made without departing from the scope of the present invention. For example, in existing fuel transfer systems it is known to provide two pump stop sensors, such as fuel level sensor 26, at different levels, both of which are connected through a controller to de-energize the same motor relay. In such systems the backup fuel level sensor could be placed at a level which is higher than both of such pump stop sensors.

Other aspects, objects and advantages of the present invention can be obtained from a study of the drawings, the disclosure and the appended claims.

What is claimed is:

1. A liquid transfer system for repeatedly transferring a liquid from a main liquid source to a container while preventing overflow of the container, the system comprising:

a liquid path fluidly connecting the main liquid source to the container;

an electrically controllable flow control device positioned along the liquid path for enabling controlled delivery of liquid through the liquid path from the main liquid source to the container along the liquid path;

a first liquid level sensor operatively positioned relative to the container for sensing when the level of liquid within the container rises to a predetermined high level;

a second liquid level sensor operatively positioned relative to the container for sensing when the level of liquid within the container rises to a predetermined extreme high level;

a normally-closed switching device electrically connected between a source of electrical energy and the electrically controllable flow control device; and a normally-open switching device electrically connected between the normally-closed switching device and the electrically controllable flow control device;

the second liquid level sensor being operatively connected to the normally-closed switching device for effecting the opening thereof when the level of liquid in the container reaches the predetermined extreme high level.

2. The liquid transfer system, as set forth in claim 1, wherein the liquid level sensor responsively produces an output indicative of the level of liquid within the container having risen to the predetermined extreme high level, the system further comprising:

a controller connected to the liquid level sensor for receiving the extreme high level indicative output therefrom, the controller connected to the normally-closed switching device and responsively applying a control signal to the normally-closed switching device upon receipt of the extreme high level indicative output, the control signal effecting the opening of the normally-closed switching device.

3. The liquid transfer system, as set forth in claim 2, wherein the liquid level sensor is operable to produce an output signal having a parameter which varies as the level of fuel in the fuel tank varies, and the controller is operable to apply the control signal to the normally-closed switching device when the output signal parameter reaches a predetermined level.

4. A fuel transfer system for repeatedly transferring fuel from a main fuel source to a fuel tank and preventing overflow of the fuel tank as a result of such fuel transfer, the system comprising;

a fuel path fluidly connecting the main fuel source to the fuel tank;

an electrically controllable flow control device positioned along the fuel path for enabling controlled delivery of fuel through the liquid path from the main fuel source to the fuel tank along the fuel path;

a normally-open switching device electrically connected between a source of electrically energy and the electrically controllable flow control device;

a normally-closed switching device electrically connected in series between the source of electrical energy and the normally-open switching device;

a fuel level sensor operatively positioned relative to the fuel tank for sensing a level of fuel within the fuel tank and producing an output indicative of such level;

an electronic controller electrically connected to the fuel level sensor for receiving the output therefrom, the normally-open switching device for controlling the closing and opening thereof, and the normally-closed switching device for controlling the opening thereof, the controller being operative to open the normally-closed switching device when the controller receives the output from the fuel level sensor, the opening of the normally-closed switching device removing the source of electrical energy from the normally-open switching device.

5. The fuel transfer system, as set forth in claim 4, further comprising a second fuel level sensor, and a third fuel level sensor, the second and third fuel level sensors being connected to the electronic controller, the third fuel level sensor is operable to produce an output indicative of the level of fuel within the tank having fallen to a third predetermined level, the second fuel level sensor is operable to produce an output indicative of the level of fuel within the tank having risen to a second predetermined level which is higher than the third predetermined level, and wherein the fuel level sensor comprises a first fuel level sensor operable to produce an output indicative of the level of fuel within the tank having risen to a first predetermined level which is higher than the second predetermined level.

6. The fuel transfer system, as set forth in claim 4, wherein the fuel level sensor produces an output signal having a parameter which varies as the level of fuel within the fuel tank varies.

7. The fuel transfer system, as set forth in claim 4, wherein the normally-closed switching device comprises a shunt trip breaker and the normally-open switching device comprises a relay.

8. The fuel transfer system, as set forth in claim 4, wherein the main fuel source comprises a bulk fuel tank.

9. The fuel transfer system, as set forth in claim 4, wherein the electrically controllable flow control device comprises a pump which is operated by a motor.

10. The fuel transfer system, as set forth in claim 4, wherein the fuel tank is connected for providing fuel to an internal combustion engine.

11. An overflow prevention mechanism for use in association with a fuel transfer system, the fuel transfer system including a pump fluidly connected between a source of fuel and a fuel tank which may be filled with fuel from the source of fuel by operation of the pump, the pump controlling delivery of fuel through a liquid path between the source and fuel tank, a relay electrically connected between a source of electrical energy and a pump motor which operates the pump, and a fuel level sensor operatively positioned relative to the fuel tank for sensing when the fuel level within the fuel tank reaches a predetermined high level at which it is desired to stop further fuel transfer thereto, the fuel level sensor operatively connected to the relay to effect control thereof, the overflow prevention mechanism comprising:

a backup fuel level sensor for sensing if the level of fuel within the fuel tank reaches an extreme high level which is higher than the predetermined high level and corresponds to a overfilling condition, the backup fuel sensor operable to produce an output when the fuel level within the tank reaches the extreme high level; and a shunt trip breaker electrically connected in series between the source of electrical energy and the relay, the shunt trip breaker operatively connected to the backup fuel level sensor so as to respond to the production of the backup fuel level sensor output by opening, thereby disconnecting the pump motor from the source of electrical energy when the fuel level within the fuel tank reaches the extreme high level.

12. The overflow prevention mechanism, as set forth in claim 11, further comprising:

a controller; and wherein the backup fuel level sensor is connected to the controller and the controller is connected to the shunt trip breaker, the controller responsive to the backup fuel sensor extreme high level indicative output to provide a control signal to the shunt trip breaker which effects the opening thereof.

13. The overflow prevention mechanism, as set forth in claim 11, wherein a control input of the shunt trip breaker is directly connected to the backup fuel level sensor.

14. The overflow prevention mechanism, as set forth in claim 11, wherein the fuel tank is connected to provide fuel to an internal combustion engine.

15. A material transfer system for repeatedly transferring a material from a main source to a container while inhibiting the occurrences of undesirable material levels in the container, the system comprising:

- a material path physically connecting the main source to the container for delivery of material between the main source and the container;
- an electrically controllable flow control device positioned along the material path for enabling controlled delivery of material through the material path from the main source to the container along the material path;
- a first material level sensor operatively positioned relative to the container for sensing when a level of material within the container reaches a first predetermined material level;
- a second material level sensor corresponding to a second predetermined material level;
- a third material level sensor corresponding to a third predetermined material level;
- a normally-closed switching device electrically connected between a source of electrical energy and the electrically controllable flow control device; and
- a normally-open switching device electrically connected between the source of electrical energy and the electrically controllable flow control device, the normally-open switching device being in series with the normally-closed switching device;
- the first material level sensor being operatively connected to the normally-closed switching device for effecting the opening thereof when the level of material in the container reaches the first predetermined material level,
- the second and third material level sensors being connected to the electronic controller, the third material level sensor being operable to produce an output indicative of the level of material within the tank having fallen to a third predetermined material level, the second material level sensor being operable to produce an output indicative of the level of material within the tank having risen to a second predetermined material level which is higher than the third predetermined material level, and the first material level sensor is operable to produce an output indicative of the level of material within the tank having risen to the first predetermined material level which is higher than the second predetermined material level.

* * * * *